United States Patent
Kim

(10) Patent No.: US 12,383,088 B2
(45) Date of Patent: Aug. 12, 2025

(54) JUICER

(71) Applicant: NUC Electronics Co., Ltd., Daegu (KR)

(72) Inventor: Jong Boo Kim, Daegu (KR)

(73) Assignee: NUC Electronics Co., Ltd., Daegu (KR)

(*) Notice: Subject to any disclaimer, the term of this patent is extended or adjusted under 35 U.S.C. 154(b) by 395 days.

(21) Appl. No.: 18/159,609

(22) Filed: Jan. 25, 2023

(65) Prior Publication Data

US 2023/0233011 A1    Jul. 27, 2023

(30) Foreign Application Priority Data

Jan. 26, 2022    (KR) .................. 10-2022-0011234

(51) Int. Cl.
A47J 19/02    (2006.01)
(52) U.S. Cl.
CPC .................. A47J 19/025 (2013.01)
(58) Field of Classification Search
CPC ............ A23N 1/02; A47J 19/06; A47J 19/025
See application file for complete search history.

(56) References Cited

U.S. PATENT DOCUMENTS

2016/0088969 A1    3/2016    Kim

FOREIGN PATENT DOCUMENTS

| DE | 212020000284 U1 * | 1/2021 | .............. A23N 1/02 |
|---|---|---|---|
| KR | 20150094102 A | 8/2015 | |
| KR | 20160111739 A | 9/2016 | |
| KR | 10-2020-0005626 A | 1/2020 | |
| KR | 20200005626 A * | 1/2020 | .............. A47J 19/02 |
| KR | 20-2021-0000946 U | 5/2021 | |
| WO | WO 2006070980 A1 | 7/2006 | |

OTHER PUBLICATIONS

Translation of DE-212020000284.*
Translation of KR-20200005626.*

* cited by examiner

*Primary Examiner* — Bobby Yeonjin Kim
(74) *Attorney, Agent, or Firm* — Seed Intellectual Property Law Group LLP

(57) ABSTRACT

A juicer is disclosed. The juicer includes: a juice-extraction drum crushing and squeezing a juicing target and receiving a screw therein; a hopper coupled to the juice-extraction drum to define a predetermined space receiving the juicing target therein, and comprising an inner protrusion protruding from an inner surface of the hopper toward a central axis of the hopper; and a blade coupled to the hopper to be rotated about the central axis of the hopper and cutting the juicing target before the juicing target reaches the screw, wherein the blade includes: a lower blade rotated in a state of closely contacting a bottom surface of the hopper; and an upper blade bent to cover the inner protrusion of the hopper from above, wherein the upper blade crushes the juicing target in cooperation with the inner protrusion of the hopper.

19 Claims, 7 Drawing Sheets

JUICER

TECHNICAL FIELD

The present disclosure relates to a juicer.

BACKGROUND

This section provides background information related to the present disclosure which is not necessarily prior art.

A conventional juicer extracts a juice from a juicing target by putting the juicing target into a hopper and crushing the juicing target using a blade rotating at high speed. However, such a juicer has problems in that a juicing target can lose its unique taste and nutrients during high-speed crushing and, in the case of a juicing target such as vegetables, it is difficult to extract a juice from stems or leaves of the juicing target. In addition, such a juicer has difficulty in extracting a juice from viscous fruits such as mango and is ineffective in making soy milk from soybeans.

In order to solve these problems, there has been released a juicer which crushes a juicing target using a mesh and a low-speed screw disposed inside the mesh. Such a juicer is capable of extracting a juice from viscous fruits as well as making soy milk from soybeans.

However, this low-speed juicer has requirements related to the size of a juicing target depending on the size of the screw. Accordingly, a user needs to cut a juicing target to an appropriate size before putting the juicing target into an inlet of the juicer.

SUMMARY

Embodiments of the present invention are conceived to solve such problems in the art and provide a juicer which includes a blade divided into an upper blade and a lower blade and disposed inside a hopper disposed at an upper end of a juice-extraction drum, such that a juicing target can be cut by the upper blade and the lower blade before reaching a screw, thereby eliminating the need for a user to cut the juicing target to a small size before putting the juicing target into the hopper.

Embodiments of the present invention provide a juicer in which a rotating upper blade can efficiently cut a juicing target in cooperation with an inner protrusion formed on an inner wall of the hopper.

Embodiments of the present invention provide a juicer in which the inner protrusion of the hopper has a downward slope to prevent a cut juicing target from remaining on the inner protrusion.

In accordance with one aspect of the present invention, a juicer includes: a juice-extraction drum crushing and squeezing a juicing target and receiving a screw therein; a hopper coupled to the juice-extraction drum to define a predetermined space receiving the juicing target therein, and including an inner protrusion protruding from an inner surface of the hopper toward a central axis of the hopper; and a blade coupled to the hopper to be rotated about the central axis of the hopper and cutting the juicing target before the juicing target reaches the screw, wherein the blade includes: a lower blade rotated in a state of closely contacting a bottom surface of the hopper; and an upper blade bent to cover the inner protrusion of the hopper from above, wherein the upper blade crushes the juicing target in cooperation with the inner protrusion of the hopper.

According to embodiments of the present invention, even when a user does not cut a juicing target to a small size before putting the juicing target into the hopper, the juicing target can be cut by the upper blade and the lower blade before reaching the screw to be juiced by the screw and a mesh, thereby providing improved juice extraction efficiency.

According to embodiments of the present invention, a juicing target can be efficiently cut through cooperation between the rotating upper blade and the inner protrusion formed on the inner wall of the hopper.

According to embodiments of the present invention, a cut juicing target can be prevented from remaining on the inner protrusion of the hopper by virtue of the downward slope formed on the inner protrusion.

BRIEF DESCRIPTION OF THE DRAWINGS

The above and other aspects, features, and advantages of embodiments of the present invention will become apparent from the following detailed description in conjunction with the accompanying drawings.

DETAILED DESCRIPTION OF EMBODIMENTS

Figure 1:
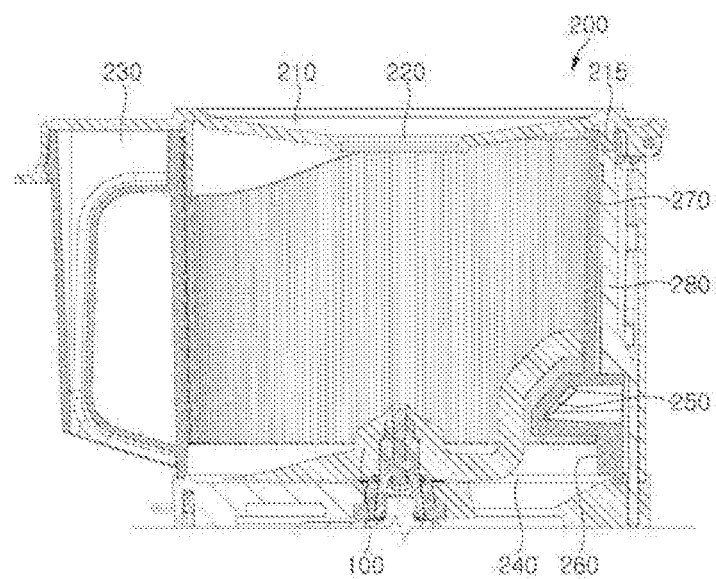
FIG. 1 is a sectional view of a hopper according to one embodiment of the present invention.

Hereinafter, embodiments of the present invention will be described with reference to the accompanying drawings. It should be noted that like components will be denoted by like reference numerals throughout the specification and the accompanying drawings. In addition, descriptions of known functions and constructions which may unnecessarily obscure the subject matter of the present invention will be omitted.

It will be understood that, although the terms "first", "second", "i)", "ii)", "a)", b)", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. In addition, it will be understood that the terms "includes", "comprises", "including" and/or "comprising", when used in this specification, specify the presence of stated features, steps, operations, elements, and/or components, but do not preclude the presence or addition of one or more other features, steps, operations, elements, components, and/or groups.

Referring to FIG. 1 to FIG. 12, a juicer 10 according to one embodiment of the present invention includes all or some of the following components: a blade 100, a hopper 200, a juice-extraction drum 300, and a main body 400.

Figure 2:
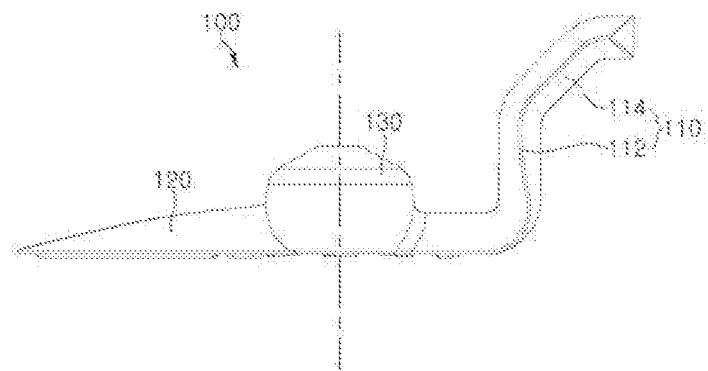
FIG. 2 is a side view of a blade according to one embodiment of the present invention.
Figure 3:
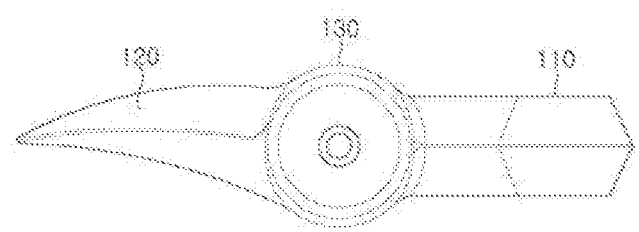
FIG. 3 is a top view of the blade of FIG. 2.
Figure 4:
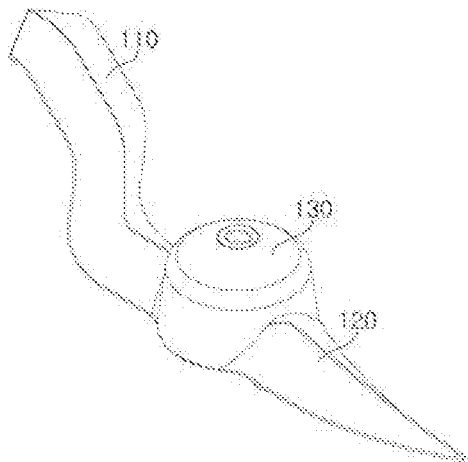
FIG. 4 is a top perspective view of the blade of FIG. 2.
Figure 5:
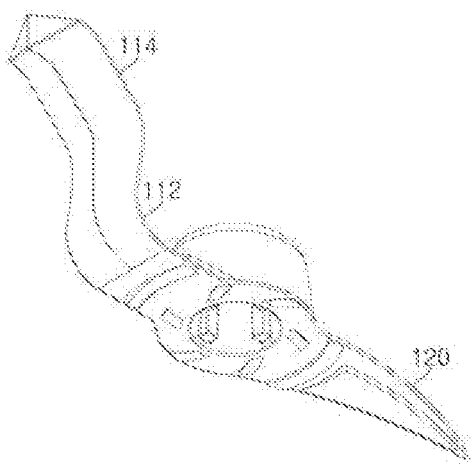
FIG. 5 is a bottom perspective view of the blade of FIG. 2.

Referring to FIG. 2 to FIG. 4, the blade 100 includes an upper blade 110, a lower blade 120, and a blade securing member 130.

The blade 100 is secured to a bottom surface of the hopper 200 by the blade securing member 130 and is rotated about a central axis of the hopper. Here, the central axis is indicated by the dotted line in FIG. 2. The blade 100 cuts a juicing target introduced into the hopper 200 through an inlet 220 of the hopper 200 before the juicing target reaches a screw 320. Accordingly, even when a user does not cut a juicing target into a small size before putting the juicing target into the inlet, the juicing target is primarily cut by the blade 100 before reaching the screw 320, thereby helping the user avoid the hassle of needing to cut the juicing target personally.

The upper blade 110 includes a first upper blade 112 and a second upper blade 114.

The first upper blade 112 extends in a vertically upward direction with respect to the bottom surface of the hopper 200. The first upper blade 112 may be spaced a predetermined distance apart from the central axis and may be formed to a height sufficient to allow the second upper blade 114 to cover an upper end of a hopper inner protrusion 250 during rotation.

As described above, the first upper blade 112 is spaced a certain distance apart from the central axis. Here, the certain distance means a distance that allows the second upper blade 114 to cut a juicing target in cooperation with the hopper inner protrusion 250. For example, when the first upper blade 112 is at a long distance from the central axis, the hopper inner protrusion 250 has a relatively small length and, when the first upper blade 112 is at a short distance from the central axis, the hopper inner protrusion 250 has a relatively large length. That is, the first upper blade 112 is spaced apart from the central axis by a distance that allows the upper blade 110 to cut a juicing target in cooperation with the hopper inner protrusion 250.

The first upper blade 112 may extend in a vertically upward direction or in an obliquely upward direction with respect to the bottom surface of the hopper 200. Herein, it is assumed that the first upper blade 112 extends in a vertically upward direction with respect to the bottom surface of the hopper 200.

When the first upper blade 112 extends in the vertically upward direction, the first upper blade 112 extends to a location corresponding to the hopper inner protrusion 250. That is, the first upper blade 112 has one end placed on the bottom surface of the hopper 200 and the other end placed at a location corresponding to the hopper inner protrusion 250. In other words, the other end of the first upper blade 112 is at a height corresponding to the hopper inner protrusion 250.

The second upper blade 114 extends from the other end of the first upper blade 112 to be inclined toward an inner surface of the hopper 200. The second upper blade 114 is bent to cover the hopper inner protrusion 250 from above. Here, it is desirable that the second upper blade 114 be spaced a certain distance apart from the hopper inner protrusion 250 rather than directly contacting the hopper inner protrusion 250.

In the juicer 10 according to one embodiment of the present invention, the upper blade 110 of the blade 100 cooperates with the hopper inner protrusion 250 during rotation. A juicing target is primarily cut through cooperation between the upper blade 110 and the hopper inner protrusion 250 and then is cut once more by the lower blade 120. Here, since the second upper blade 114 of the upper blade 110 cuts a juicing target while passing over the upper end of the hopper inner protrusion, the cut juicing target falls naturally.

Since both the second upper blade 114 and the hopper inner protrusion 250 are inclined toward the central axis, a cut juicing target falls naturally. In addition, since both the second upper blade 114 and the hopper inner protrusion 250 are inclined toward the central axis, juicing targets can be gathered at the center of the hopper rather than being pushed outwards.

In addition, the second upper blade 114 has a shape tapered to a point. This is the same reason that the hopper inner protrusion 250 is tapered to a point. When the second upper blade 114 is tapered to a point, the hopper inner protrusion 250 and the upper blade 110 cooperate more efficiently, thereby ensuring better cutting of a juicing target.

In other words, since the second upper blade 114 and the hopper inner protrusion 250 correspond in shape to each other, a juice target can be cut better.

In addition, a lower surface of the second upper blade 114, that is, a surface of the second upper blade 114 facing the bottom surface of the hopper 200 forms a V-shaped edge. That is, the sharp V-shaped edge increases cutting efficiency. In addition, since the hopper inner protrusion has an upper surface tapered to a sharp edge and the lower surface of the second upper blade 114 forms the sharp V-shaped edge, a cut juicing target falls without remaining on the second upper blade 114 or on the hopper inner protrusion 250. Here, since the lower surface of the second upper blade 114 is tapered to a sharp edge, a cut juicing target falls along the lower surface of the second upper blade 114. In addition, a juicing target remaining on the hopper inner protrusion 250 also falls along the upper surface of the hopper inner protrusion 250. That is, since the hopper inner protrusion 250 has a pair of slopes 252 corresponding to the lower surface of the second upper blade 114, the hopper inner protrusion 250 has a contact surface tapered to a point toward an upper end thereof. In addition, the hopper inner protrusion 250 is tapered to a point from the inner surface of the hopper toward the central axis.

A juicing target cut by the upper blade 110 and the lower blade 120 falls into a communication hole 240 formed through the bottom surface of the hopper 200 to be moved to a mesh 310.

The lower blade 120 is rotated in a state of closely contacting the bottom surface of the hopper 200. The lower blade 120 cuts a juicing target cut by the upper blade 110 once more while moving the juicing target to the communication hole 240.

The lower blade 120 is tapered to a point toward the inner surface of the hopper 200. In addition, the lower blade 120 is tapered to a sharp edge toward an upper end thereof.

The blade securing member 130 secures the upper blade 110 and the lower blade 120 to the central axis. Accordingly, the upper blade 110 and the lower blade 120 are rotated rapidly about the central axis.

The hopper 200 includes all or some of the following components: a lid 210, an inlet 220, a handle 230, a communication hole 240, a hopper inner protrusion 250, and a hopper auxiliary inner protrusion 260.

The hopper 200 is disposed at an upper end of the juice-extraction drum 300. The hopper 200 defines a space into which a juicing target is introduced, and allows the juicing target to be cut in the space and moved to the screw 320.

The lid 210 is disposed at an upper end of the hopper and is secured to the hopper via a hinge to be opened or closed by external force applied by a user.

The inlet 220 is formed at a center of the lid 210 and allows a juicing target to be introduced into the hopper 200 therethrough. Accordingly, when a user puts a juicing target having a size sufficient to pass through the inlet 220 into the inlet 220, the juicing target can be cut and juiced by the juicer 10.

The handle 230 is disposed on an outer surface of the hopper and allows a user to conveniently separate the hopper 200 from the juicer.

The communication hole 240 is formed inside the hopper 200, more specifically on the bottom surface of the hopper 200. The communication hole 240 may be a fan-shaped opening formed through a portion of the bottom surface. Accordingly, a juicing target cut by the upper blade 110 or the lower blade 120 reaches the screw 320 through the communication hole 240.

The communication hole 240 may be formed at a location where a juicing target cut by the blade 100 falls to the juice-extraction drum 300. For example, when the hopper inner protrusion 250 is located directly above the communication hole 240, a juicing target cut by the upper blade 110 falls to the communication hole 240.

The hopper inner protrusion 250 cuts and crushes a juicing target in cooperation with the blade 100. More specifically, the hopper inner protrusion 250 cuts a juicing target in cooperation with the upper blade 110.

The hopper inner protrusion 250 protrudes from the inner surface of the hopper 200 toward the central axis and may be formed at a height corresponding to the first upper blade 112. The hopper inner protrusion 250 extends by a length inversely proportional to the distance between the first upper blade 112 and the central axis. For example, when the first upper blade 112 is at a long distance from the central axis, the hopper inner protrusion 250 has a relatively small length. That is, the length of the hopper inner protrusion 250 is set to be inversely proportional to the distance between the first upper blade 112 and the central axis.

The hopper inner protrusion 250 has a shape corresponding to the second upper blade 114 and is tapered to a point at an upper portion thereof. Accordingly, a cut juicing target falls along the slope 252 of the hopper inner protrusion 250.

In addition, the hopper inner protrusion 250 is tapered to a point both in the direction of the central axis and in the direction of the bottom surface of the hopper. Thus, the hopper inner protrusion 250 has pointed tips in the direction of the central axis and in the direction of the bottom surface of the hopper, respectively, thereby ensuring efficient cutting and falling of a juicing target.

In addition, at least one hopper inner protrusion 250 may be formed on the inner surface of the hopper 200. When the number of hopper inner protrusions increases, a juicing target is likely to remain on the hopper inner protrusion 250 although more efficient cutting of the juicing target can be achieved. Accordingly, it is desirable that an appropriated number of hopper inner protrusions be formed on the inner surface of the hopper 200.

In addition, since the hopper inner protrusion 250 is formed below the second upper blade 114 of the blade 100, the second upper blade 114 covers the hopper inner protrusion 250 during rotation. Positioning the hopper inner protrusion 250 below the second upper blade 114 is effective in allowing a juicing target cut by the upper blade 110 to fall to the bottom surface of the hopper.

If the hopper inner protrusion 250 is located above the second upper blade 114, a juicing target falling from the inlet 220 contacts the hopper inner protrusion 250 first before contacting the blade 100 and thus is cut by the upper blade 110 rotating below the hopper inner protrusion 250, resulting in inefficient cutting of the juicing target. The juicer 10 according to the present invention has the hopper inner protrusion 250 located below the second upper blade 114, thereby ensuring efficient cutting of a juicing target while allowing the cut juicing target to naturally fall to the bottom surface of the hopper 200. That is, a juicing target falling from the inlet meets the rotating upper blade 110 before being cut through cooperation between the hopper inner protrusion 250 and the upper blade 110 and then naturally falls along the lower surface of the second upper blade 114 and the slope 252 of the hopper inner protrusion 250.

Figure 6:
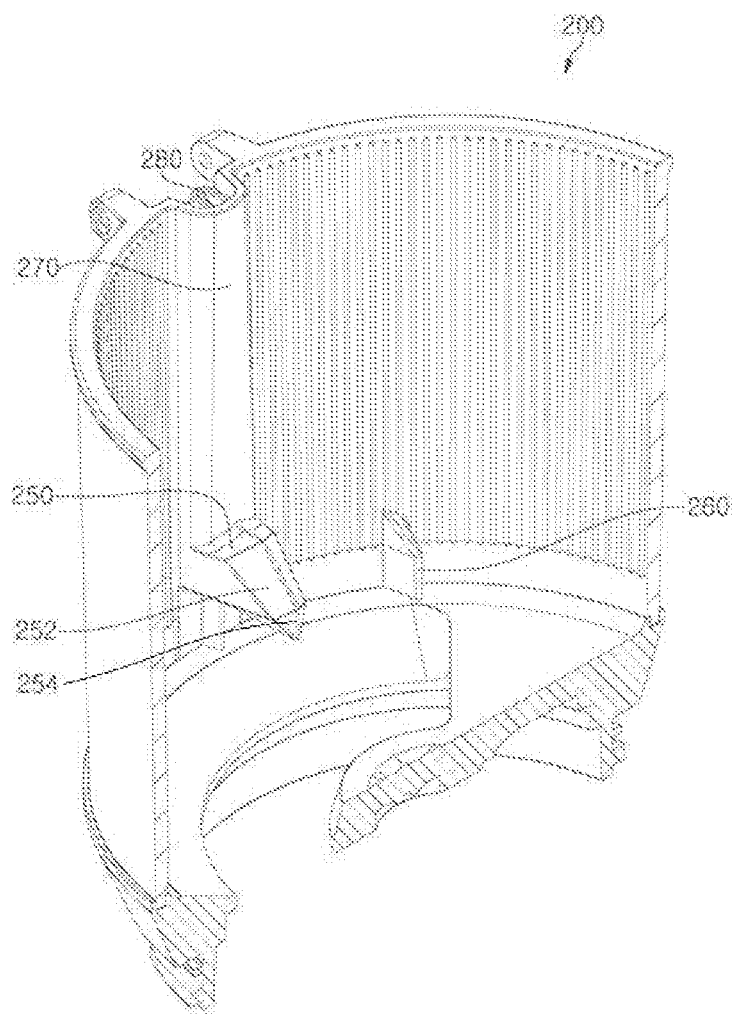
FIG. 6 is a view of an inner surface of the hopper of FIG. 1.
Figure 7:
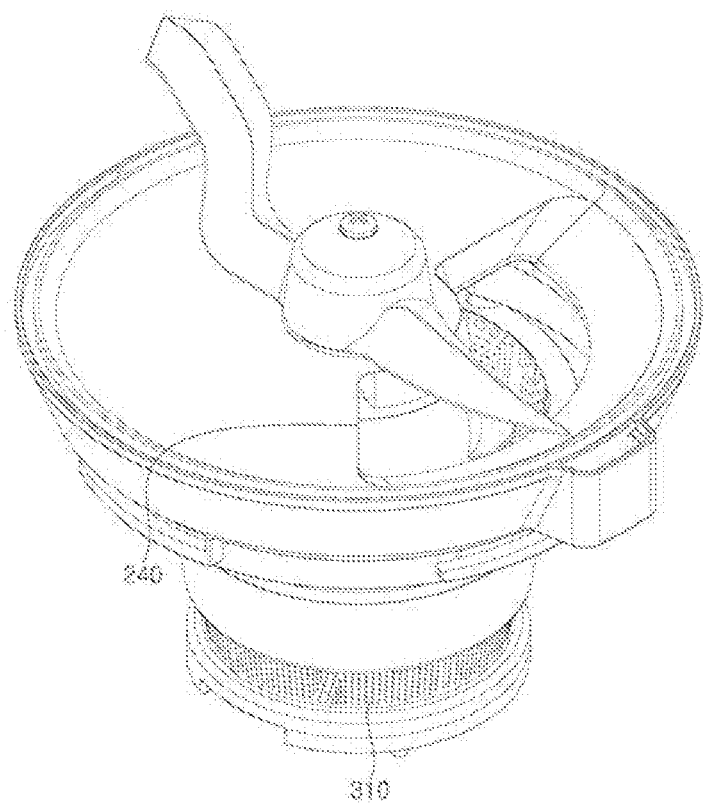
FIG. 7 is a view illustrating a state in which a bottom surface of the hopper of FIG. 1 is coupled to a mesh.
Figure 8:
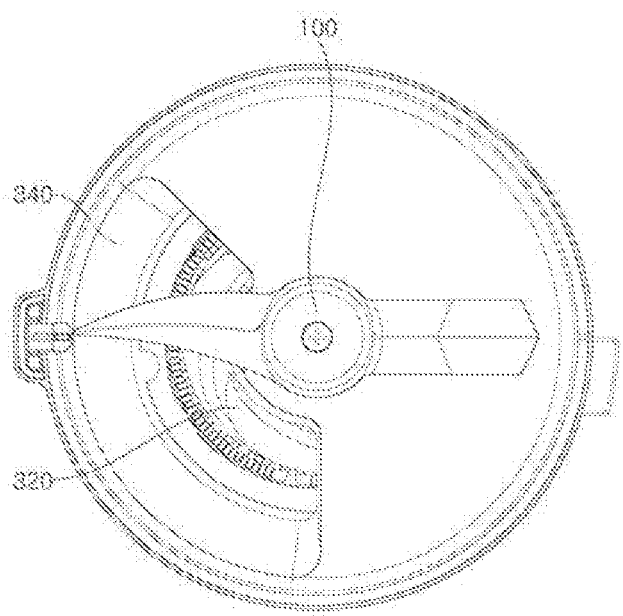
FIG. 8 is a plan view of the bottom surface of the hopper of FIG. 1.

In addition, referring to FIG. 6, a vertical surface 254 is formed at an end of the slope 252 in a direction perpendicular to the bottom surface of the hopper, such that a juicing target moved down along the slope 252 meets the vertical surface 254 and falls to the bottom surface of the hopper 200.

The hopper auxiliary inner protrusion 260 is formed on a lower inner surface of the hopper 200 and cuts a juicing target in cooperation with the lower blade 120.

The hopper auxiliary inner protrusion 260 is formed at a height corresponding to the height of the lower blade 120 and has a length inversely proportional to the length of the lower blade 120. For example, when the length of the lower blade 120 is relatively large, the length of the hopper auxiliary inner protrusion 260 is relatively small. On the other hand, when the length of the lower blade 120 is relatively small, the length of the hopper auxiliary inner protrusion 260 is relatively large.

Accordingly, the lower blade 120 cooperates with the hopper auxiliary inner protrusion 260 to secondarily cut a juicing target primarily cut by the upper blade 110 and then guides the secondarily cut juicing target to the mesh 310.

The hopper 200 may further include a hopper inner protruding bar 270 protruding from an inner wall of the hopper 200, in which the hopper inner protruding bar 270 is located above the hopper inner protrusion 250. More specifically, the hopper inner protrusion 250 is formed at a lower end of the hopper inner protruding bar 270. Thus, the hopper inner protruding bar 270 is connected to the hopper inner protrusion 250.

The hopper inner protruding bar 270 performs similar functions to the hopper inner protrusion 250. For example, when a juicing target rotating inside the hopper 200 meets the hopper inner protruding bar 270, the juicing target is caught on the hopper inner protruding bar 270 to be cut by the upper blade 110.

The hopper inner protruding bar 270 extends long in a longitudinal direction of the hopper, and the hopper inner protrusion 250 formed at the lower end of the hopper inner protruding bar 270 extends toward the central axis. The hopper inner protruding bar 270 formed on the inner surface of the hopper 200 allows the hopper inner protrusion 250 and the upper blade 100 to cut a juicing target more effectively by stopping the juicing target rotating inside the hopper. For example, a long juicing target, such as carrot or celery, often spins with no traction in a state of lying sideways in an upper region of the hopper. The hopper inner protruding bar 270 formed on the inner surface of the hopper 200 is effective in preventing this phenomenon.

The hopper 200 may further include a safety rod 280 vertically disposed on a cylindrical surface of the hopper 200. The safety rod 280 may be disposed in a region of the cylindrical surface of the hopper, in which the hopper inner protruding bar 270 is formed. For example, the safety rod 280 may be inserted into an empty space formed inside the hopper inner protruding bar 270 which protrudes toward the central axis.

The safety rod 280 is configured to be pressed down by a pressing portion 215 protruding from an end of the lid 210. When the safety rod 280 is pressed down, an underlying safety switch (not shown) stops operation of a drive motor of the main body 400.

If the drive motor is operated with the lid 210 open, a user's hand is likely to be drawn into the hopper 200, which can lead to accidents. With the safety rod 280 configured to be moved downwards when the lid 210 is opened, the juicer according to the present invention can prevent such accidents. More specifically, when the lid 210 is open, the pressing portion 215 presses the safety rod 280 down and, when the lid 210 is closed, the pressing unit 215 no longer presses the safety rod 280. That is, by operatively connecting the drive motor to the lid 210 using the safety rod 280, it is possible to ensure user safety in use. In other words, the juicer 10 according to the present invention uses the safety rod 280 to stop operation of the drive motor connected to the blade 100 when the lid 210 is open, thereby preventing accidents that threaten user safety.

Figure 9:
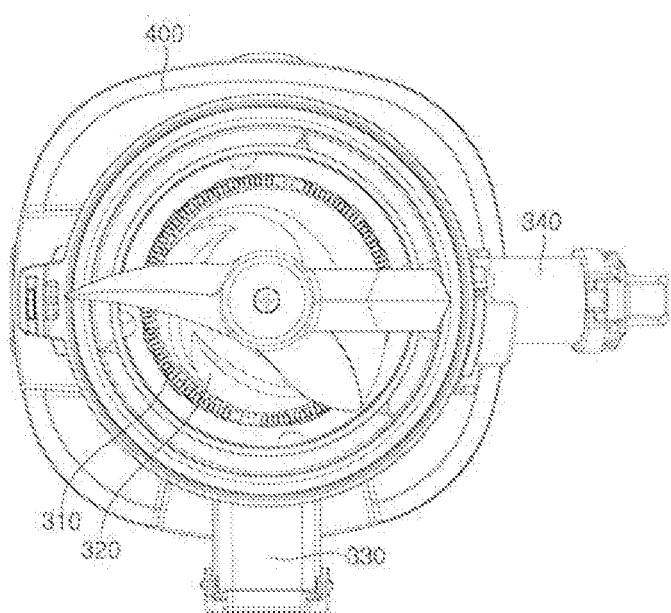
FIG. 9 is a plan view of a juice-extraction drum coupled with a main body according to one embodiment of the present invention.
Figure 10:
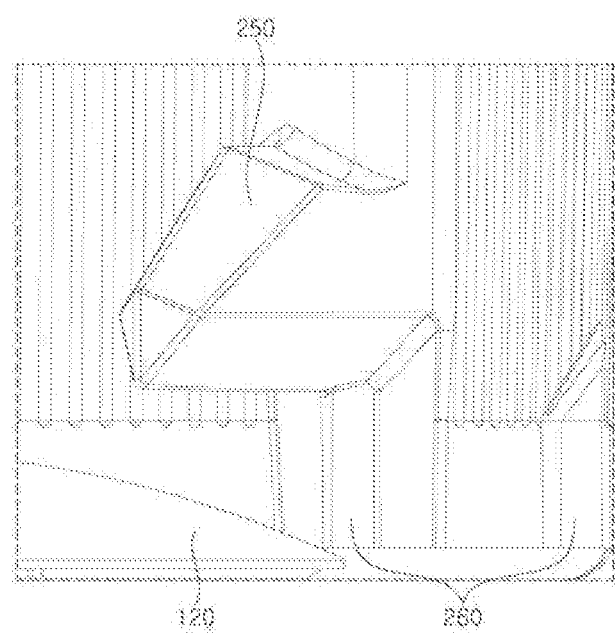
FIG. 10 is a sectional view of a lower inner surface of the hopper of FIG. 1.

Referring to FIG. 9, the juice-extraction drum 300 includes a mesh 310, a screw 320, a residue discharge port 330, and a juice discharge port 340.

The juice-extraction drum 300 is detachably coupled to the main body 400. In addition, the juice-extraction drum 300 includes the residue discharge port 330 formed at one side thereof and the juice discharge port 340 formed at the other side thereof.

The residue discharge port 330 includes an upper base integrally formed with the juice-extraction drum 300 and a lower base detachably connected to the upper base. That is, the upper base and the lower base of the residue discharge port 330 are slidably coupled to each other to be detachable from each other.

The juice discharge port 340 is inclined downwards to allow a juice extracted by the mesh 310 and the screw 320 to be smoothly discharged to an outside of the juicer. In addition, the juice discharge port 340 may further include a reclosable opening (not shown) configured to allow or prevent the juice from being discharged to the outside of the juicer.

Figure 11:
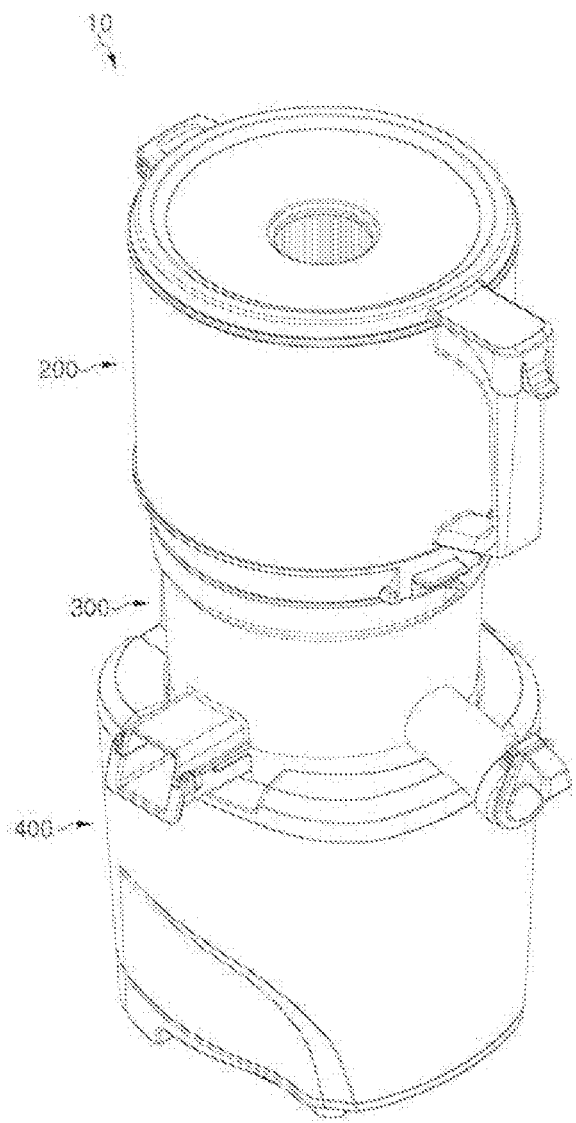
FIG. 11 is a perspective view of a juicer according to one embodiment of the present invention.
Figure 12:
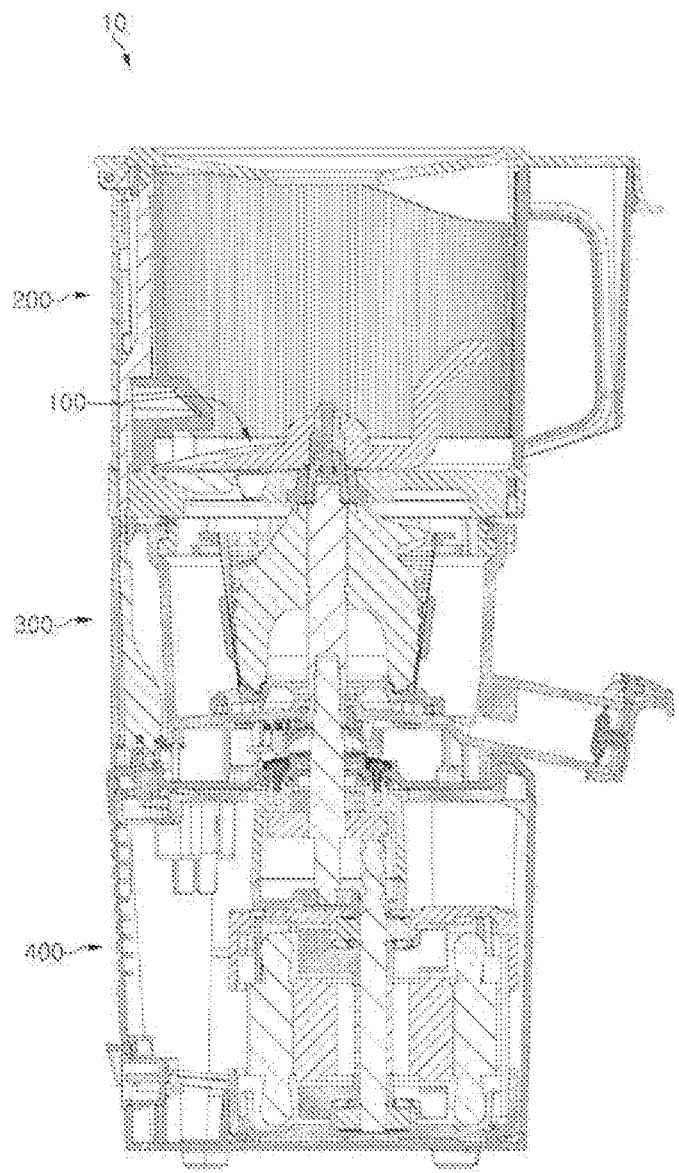
FIG. 12 is a side sectional view of the juicer of FIG. 11.

Referring to FIG. 11 and FIG. 12, the main body 400 includes a drive motor as described above, wherein the drive motor is disposed under the juice-extraction drum 300.

Although some embodiments have been described herein, it should be understood that these embodiments are presented by way of example only and that various modifications, changes, alterations, and equivalent embodiments can be made by those skilled in the art without departing from the spirit and scope of the present invention. Therefore, it should be understood that these embodiments are provided for illustration only and are not to be construed in any way as limiting the present invention. The scope of the present invention should be defined by the appended claims and the claims and their equivalents are intended to cover such modifications and the like as would fall within the scope and spirit of the invention.

This application claims priority to Korean Application No. 10-2022-0011234, filed Jan. 26, 2022, which is incorporated herein by reference in its entirety.

The invention claimed is:

1. A juicer comprising:
    a juice-extraction drum crushing and squeezing a juicing target and receiving a screw therein;
    a hopper coupled to the juice-extraction drum to define a predetermined space receiving the juicing target therein and comprising an inner protrusion protruding from an inner surface of the hopper toward a central axis of the hopper; and
    a blade coupled to the hopper to be rotated about the central axis of the hopper and cutting the juicing target before the juicing target reaches the screw,
    wherein the blade comprises: a lower blade rotated in a state of closely contacting a bottom surface of the hopper; and an upper blade bent to cover the inner protrusion of the hopper from above, the upper blade crushing the juicing target in cooperation with the inner protrusion of the hopper.

2. The juicer according to claim 1, wherein the upper blade comprises:
    a first upper blade extending in a vertically upward direction with respect to the bottom surface of the hopper; and
    a second upper blade extending from the first upper blade to be inclined toward the inner surface of the hopper.

3. The juicer according to claim 2, wherein the inner protrusion of the hopper is located below the second upper blade.

4. The juicer according to claim 2, wherein the inner protrusion of the hopper is formed at a height corresponding to the first upper blade to be inclined toward the central axis of the hopper.

5. The juicer according to claim 2, wherein the inner protrusion of the hopper has a shape corresponding to the second upper blade and cuts the juicing target in cooperation with the second upper blade.

6. The juicer according to claim 5, wherein the inner protrusion of the hopper has a pair of slopes formed at opposite lateral sides thereof and corresponding to the second upper blade.

7. The juicer according to claim 6, wherein the inner protrusion of the hopper has a vertical surface formed at an end of each of the pair of slopes and extending in a perpendicular direction with respect to the bottom surface of the hopper.

8. The juicer according to claim 1, wherein the inner protrusion of the hopper has a contact surface tapered to a point toward an upper end thereof.

9. The juicer according to claim 1, wherein the inner protrusion of the hopper has a shape tapered to a point toward the central axis of the hopper.

10. The juicer according to claim 1, wherein the hopper has a communication hole formed through the bottom surface thereof to allow the juicing target cut by the blade to fall into the juice-extraction drum through the communication hole, and the hopper inner protrusion is located directly above the communication hole.

11. The juicer according to claim 2, wherein the second upper blade has a lower surface forming a V-shaped edge.

12. The juicer according to claim 2, wherein the first upper blade is spaced apart from the central axis of the hopper.

13. The juicer according to claim 2, wherein the hopper further comprises an auxiliary inner protrusion formed on a lower inner surface thereof, the auxiliary inner protrusion cutting the juicing target in cooperation with the lower blade.

14. The juicer according to claim 13, wherein the auxiliary inner protrusion of the hopper is formed at a height corresponding to a height of the lower blade.

15. The juicer according to claim 13, wherein the auxiliary inner protrusion of the hopper has a length inversely proportional to a length of the lower blade.

16. The juicer according to claim 1, wherein the hopper further comprises an inner protruding bar protruding from an inner wall thereof and connected to the inner protrusion of the hopper.

17. The juicer according to claim 16, wherein the inner protrusion of the hopper is located at a lower end of the hopper inner protruding bar.

18. The juicer according to claim 1, wherein the hopper further comprises: a lid disposed on an upper end thereof; and a safety rod vertically movable in conjunction with opening/closing of the lid, and the safety rod stops operation of a drive motor connected to the blade when the lid is open and operates the drive motor when the lid is closed.

19. The juicer according to claim 18, wherein the lid comprises a pressing portion protruding from an end thereof, the pressing portion pressing the safety rod down when the lid is open.

* * * * *